United States Patent
Sugaya et al.

(10) Patent No.: US 6,700,873 B1
(45) Date of Patent: Mar. 2, 2004

(54) APPARATUS FOR AND METHOD OF DETECTING OPERATION ADMINISTRATION AND MAINTENANCE (OAM) CELL

(75) Inventors: Toshihiko Sugaya, Fukuoka (JP); Yumi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 776 days.

(21) Appl. No.: 09/610,386

(22) Filed: Jul. 5, 2000

(30) Foreign Application Priority Data

Jul. 5, 1999 (JP) .......................................... 11-191031

(51) Int. Cl.$^7$ ............................................. G01R 31/08
(52) U.S. Cl. .................... 370/241.1; 370/242; 370/252; 370/236.2
(58) Field of Search ............................... 370/241, 241.1, 370/242, 229, 235, 236.2, 216, 218, 279, 220, 221, 395.1, 396, 397, 401, 402, 409; 709/224

(56) References Cited

U.S. PATENT DOCUMENTS

| | | | | |
|---|---|---|---|---|
| 5,659,540 A | * | 8/1997 | Chen | 370/249 |
| 5,974,045 A | * | 10/1999 | Ohkura | 370/395 |
| 6,005,844 A | * | 12/1999 | Ono | 370/253 |
| 6,198,726 B1 | * | 3/2001 | Hayami | 370/236 |
| 6,442,131 B1 | * | 8/2002 | Kondo | 370/218 |
| 6,483,809 B2 | * | 11/2002 | Shimada | 370/241.1 |
| 6,553,015 B1 | * | 4/2003 | Sato | 370/331 |

FOREIGN PATENT DOCUMENTS

| | | |
|---|---|---|
| JP | A 5-252160 | 9/1993 |
| JP | A 9-162894 | 6/1997 |
| JP | A 9-233088 | 9/1997 |
| JP | A 10-93578 | 4/1998 |
| JP | 2806862 | 7/1998 |

* cited by examiner

*Primary Examiner*—Douglas Olms
*Assistant Examiner*—Ricardo Pizarro
(74) *Attorney, Agent, or Firm*—Young & Thompson (57) ABSTRACT

In an OAM detecting apparatus and an OAM detecting method, normal lines are not adversary influenced at occurrence of failure and one failed position can be recognized at occurrence of a double failure. A timer counter comparator generates a discard signal when a timer counter value measuring a predetermined time equal to or less than one second after reception of an OAM cell is less than a reference value. A failed position display and comparator compares, when a failed position display change flag is "0", failed position display information of a new OAM cell received with failed position display information previously stored, and generates a discard signal when the comparison results in mismatching. When the flag is "1", the display and comparator compares the failed position display information of a new OAM cell received with the failed position display information previously stored, and does not generates a discard signal even when the comparison results in mismatching. The display and comparator updates the failed position display information previously stored to the failed position display information of the new OAM cell and sets the flag to "0".

6 Claims, 7 Drawing Sheets

APPARATUS FOR AND METHOD OF DETECTING OPERATION ADMINISTRATION AND MAINTENANCE (OAM) CELL

BACKGROUND OF THE INVENTION

The present invention relates to an OAM detecting apparatus and an OAM detecting method for use with an asynchronous transfer mode (ATM) network using an asynchronous transfer mode for detecting an OAM cell in an ATM layer.

DESCRIPTION OF THE PRIOR ART

For supervisory control of a network on an ATM layer, the internal standards such as ITU-T stipulate an alarm transfer method using an OAM cell called "alarm indication signal (AIS) cell" or "remote defect indication (RDI) cell. In the ATM network including exchanges, an exchange having detected a line failure transmits one AIS cell per second in an upstream direction. Devices on the upstream sides receive the AIS cell to recognize that the line has been failed. In this situation, the devices recognize that the failed state of the line is already removed when the AIS cell is not received for a period of 2.5 seconds (±0.5 second). On the other hand, when an exchange on the upstream side detects an AIS cell, the exchange sends one RDI cell per second in a downstream direction. Devices on the upstream sides receive the RDI cell and recognize that the line has been failed. When the RDI cell is not received 2.5 seconds (±0.5 second), the devices recognize that the line failure is already restored.

The ATM layer has a sublayer called "virtual path level" which handles an OAM cell referred to as "VP-AIS cell" or "VP-RDI cell". The ATM layer includes another sublayer, i.e., virtual channel level at which an OAM cell called "VC-AIS cell" or "VC-RDI cell" is used. Discussion has been fully conducted for an alarm transfer method using the OAM cell in a system in which one station is connected to one station. However, it is required to further discuss a system in which one station is linked to a plurality of stations.

From the standpoint of traffic supervisory control, Japanese Patent Publication No. 2806862 describes a prior art employing a policing function. As can be seen from FIG. 6, this article describes a cell traffic supervisory control system. The system includes a cell detector 101 to detect a valid cell and an invalid cell of ATM cells received and to identify a VPI/VCI number, a timer counter 102, a memory cyclic unit 103, an arithmetic unit 104, a memory 105, a comparator 106, and a discarding unit 107. Timer counter 102 generates, at a timing synchronized with a cell synchronous signal, an arrival time of an ATM cell and a point of time at which memory cyclic unit 103 patrolled memory 105. Memory 105 stores for each VPI/VCI number various parameter data including an arrival time of a previous cell, a bucket counter value, a cell interval time, and a traffic threshold value. Arithmetic unit 104 calculates a bucket counter value according to a current cell arrival time, a patrol time of memory 105, and various parameter data stored for each VPI/VCI number in memory 105. Memory cyclic unit 103 updates the previous cell arrival time and the bucket counter value stored for each VPI/VCI number in memory 105 before an interval of time between the current cell arrival time of an ATM received and the previous cell arrival time of a previous cell equal in the VPI/VCI number to the current cell exceeds a predetermined limit value of timer counter 102. Comparator 106 compares the bucket counter value attained by an arithmetic unit 104 with a traffic threshold value held in memory 105. Discarding unit 107 discards the received ATM cell when the cell is recognized as an illegal or invalid cell as a result of the comparison.

When it is desired to implement an alarm transfer system using an OAM cell in an ATM network in which one station is connected to a plurality of stations, there arises a problem that a large number of RDI cells are returned from an upstream direction, which adversely influences normal lines depending on cases.

Figure 2:
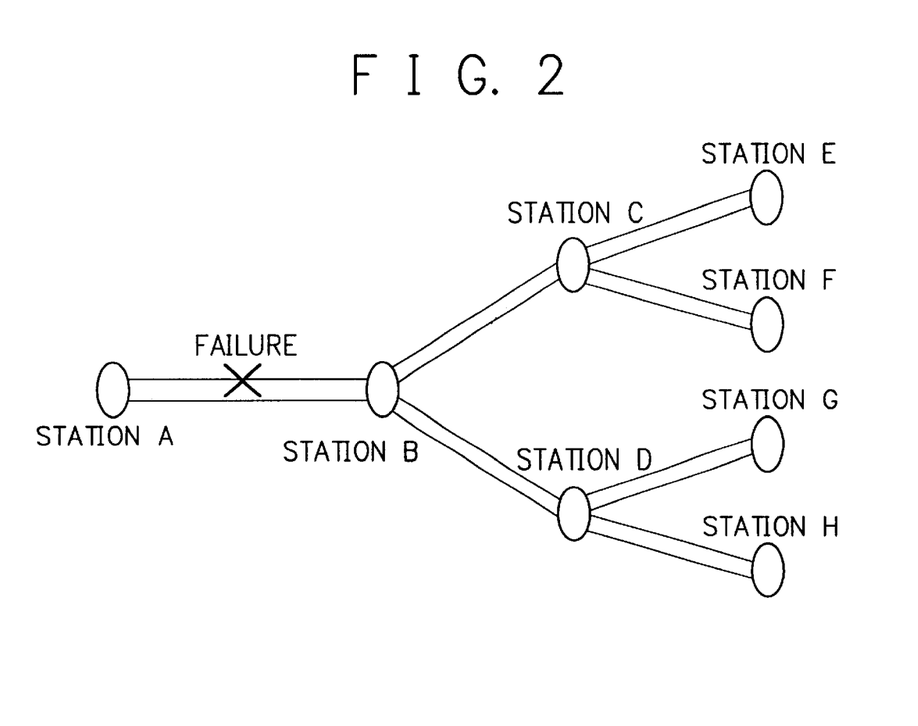
FIG. 2 is a diagram showing connections when a single failure occurs in an ATM network using the OAM cell detecting apparatus of FIG. 1.
Figure 7:
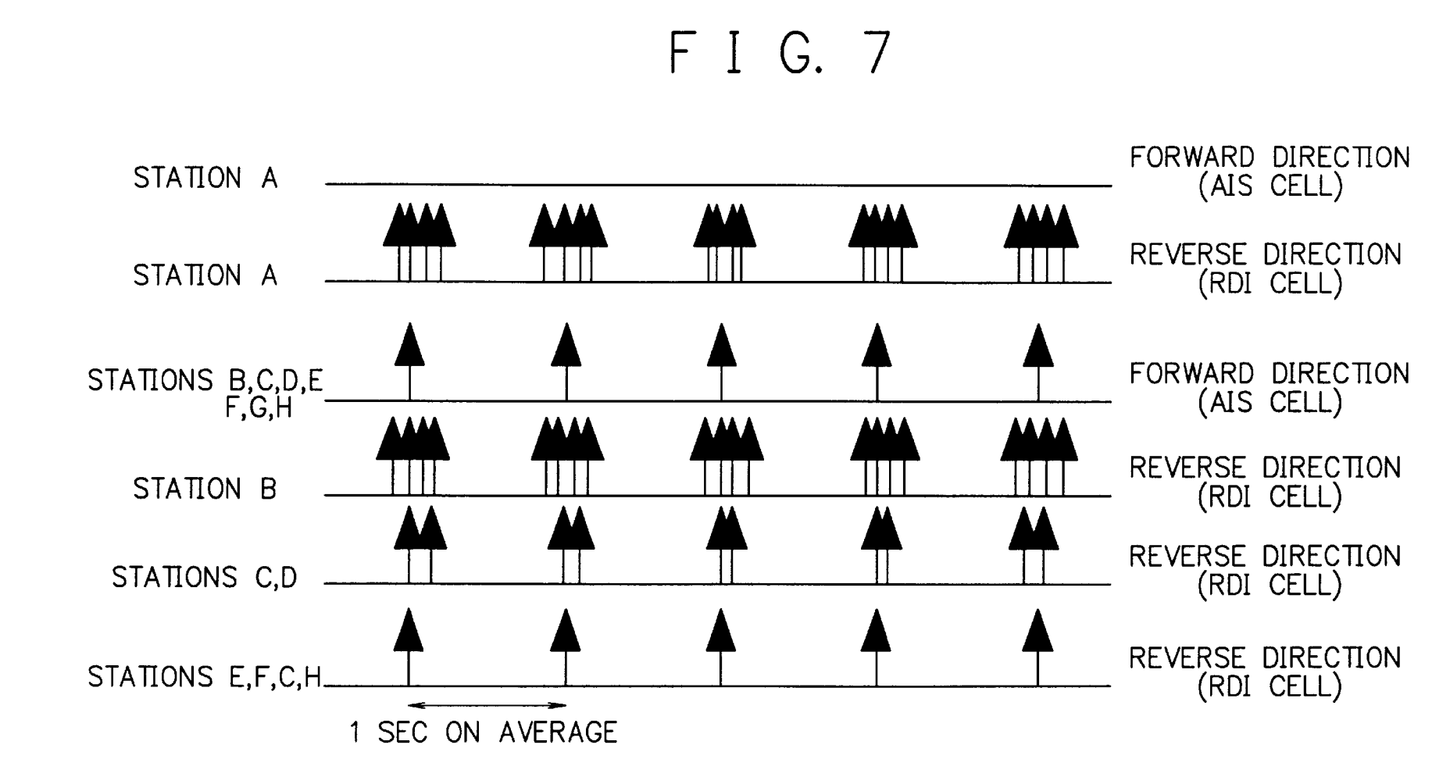
FIG. 7 is a traffic chart of AIS and RDI cells when a single failure occurs in an ATM network employing the cell traffic supervisory control method of the prior art.

For example, as can be seen from FIGS. 2 and 7, in a system in which one station is connected to a plurality of stations (FIG. 2), when a failure occurs between station A (a leaf station) and station B (a repeater station), one AIS cell is sent per second in a reverse direction. When the AIS cell is received by stations E, F, G and H (root stations), each station returns an RDI cell. Resultantly, stations A and B each receive four RDI cells per second. In consequence, if the system includes n root stations, each of stations A and B will receive n cells per second. This means that the number of RDI cells to be received considerably increases as the number of root stations becomes greater. This adversely influences normal connections depending on cases.

Figure 4:
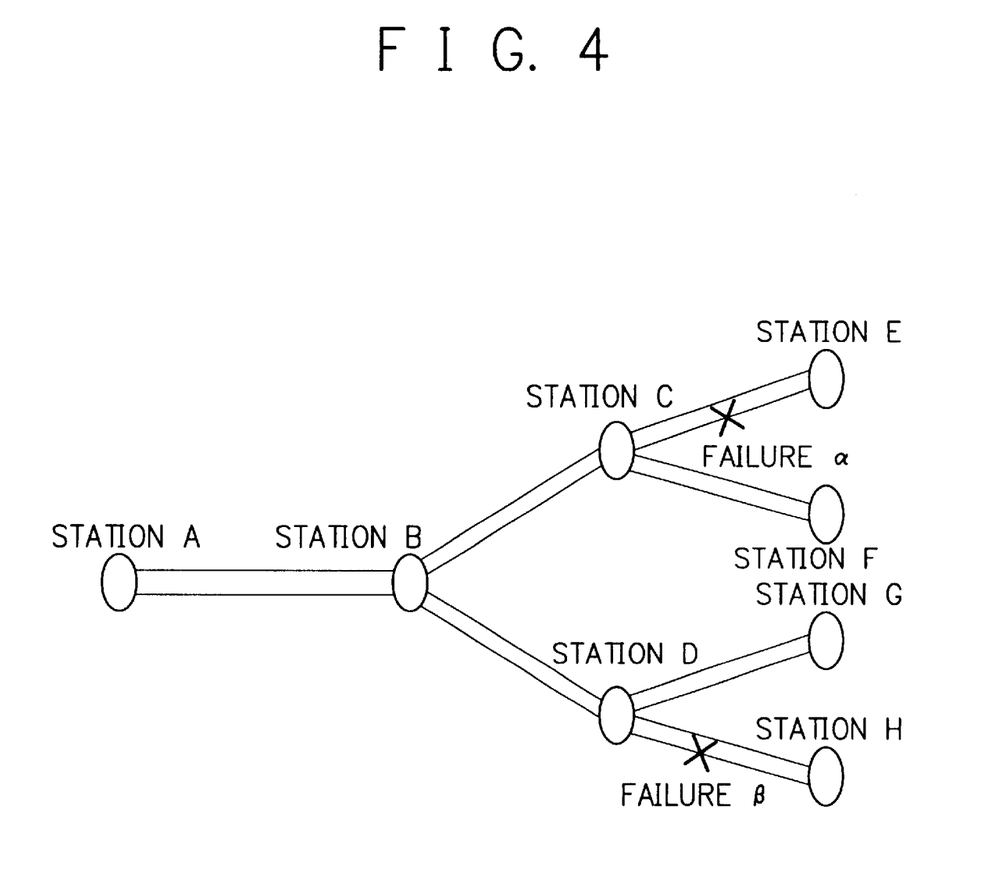
FIG. 4 is a diagram showing connections when a double failure takes place in an ATM network using the OAM cell detecting apparatus of FIG. 1.
Figure 8:
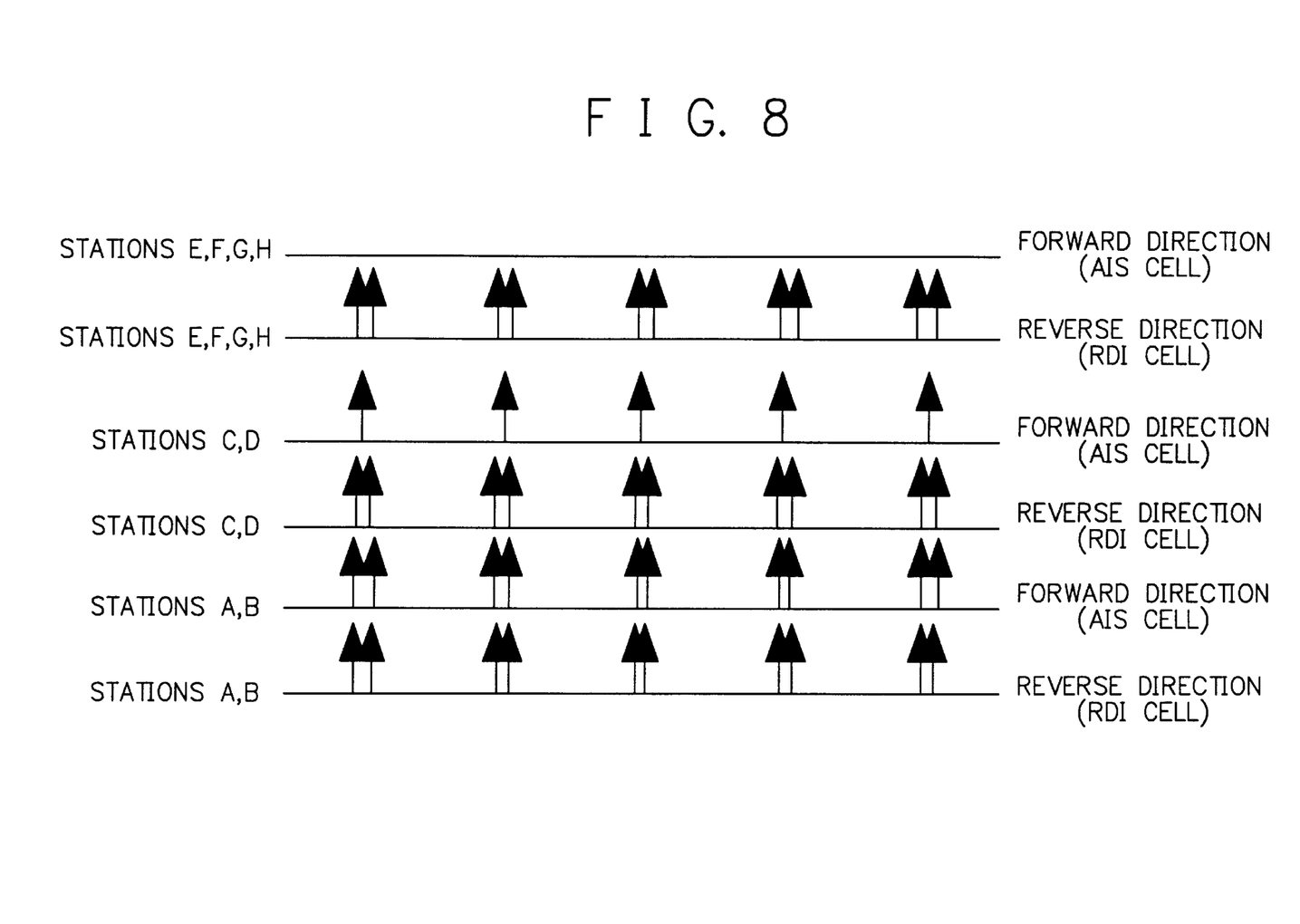
FIG. 8 is a traffic chart of AIS and RDI cells at occurrence of a double failure in an ATM network employing the cell traffic supervisory control method of the prior art.

Moreover, when a double failure occurs in an ATM network in which one station is connected to a plurality of stations, two kinds of failed position display information items are received at the same time. This possibly leads to a problem that failed positions cannot be correctly determined. For example, as shown in FIGS. 4 and 8 in which connections are established between one station and a plurality of stations, when a fault takes place between station C (repeater station) and station E (root station) as well as between station D (repeater station) and station H (root station), stations C and D each transmit an AIS cell in a forward direction (upstream to downstream). Since failed position (breakdown position) display information varies between stations C and D, the AIS cells from stations C and D are different from each other. Station A therefore receives the AIS cells including failed position display information of two different types respectively from stations C and D at the same time and hence cannot appropriately determine the failed positions. Stations A to H which determine failed positions according to RDI cells also receive two kinds of failed position display information. Consequently, it is also impossible for stations A to H to correctly determine the failed positions.

Figure 6:
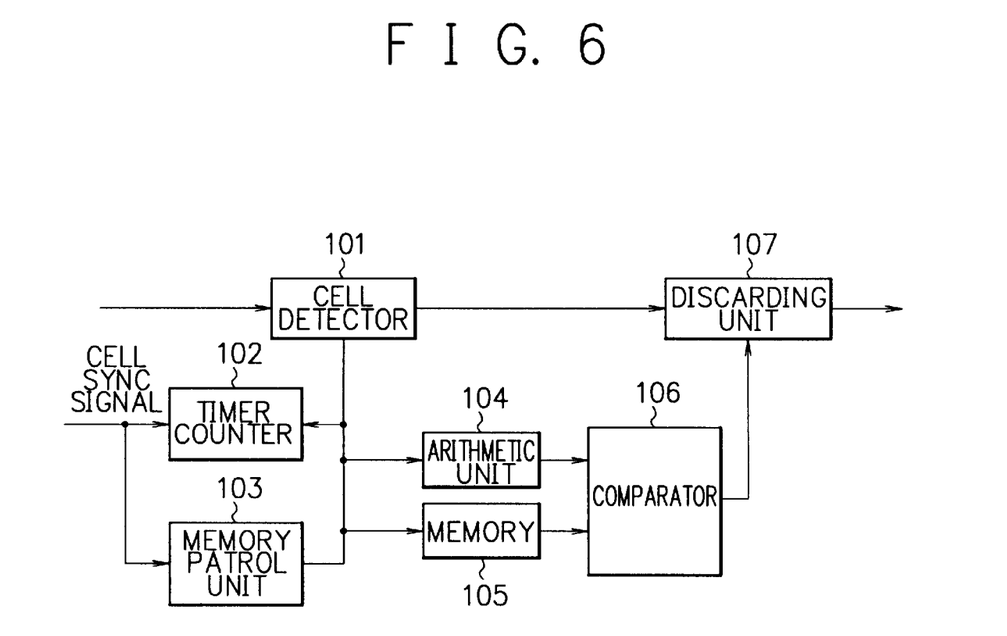
FIG. 6 is a block diagram showing a cell traffic supervisory control method of the prior art.

In a cell traffic supervisory control system of the prior art shown in FIG. 6, a large number of parameters such as the previous cell arrival time, the bucket counter, and the cell interval time are required for the supervisory control. This leads to a problem of necessity of a memory having large capacity to keep such data.

SUMMARY OF THE INVENTION

It is therefore an object of the present invention to provide an apparatus for and a method of detecting an OAM cell for use with an ATM network including connections between one station and a plurality of stations in which the OAM cell is transferred at a transfer rate of one cell per second to thereby prevent the OAM cell from adversely influencing normal lines.

Another object of the present invention is to provide an apparatus for and a method of detecting an OAM cell for use with an ATM network including connections between one station and a plurality of stations in which even when a double failure occurs in the ATM network, one failed position can be determined and the memory to keep supervisory parameters needs only small capacity.

In accordance with the present invention, there is provided an OAM cell detecting apparatus for detecting an OAM cell in an ATM layer in an ATM network in which a station is connected to a plurality of stations. The apparatus includes OAM cell detecting means for detecting an OAM cell in an ATM layer, storage means connected to the OAM cell detecting means for keeping a timer counter value and failed state information for each virtual path or channel, timer incrementing means connected to the storage means for incrementing the timer counter value independently of a cell receiving period and for keeping, when the timer counter value exceeds a predetermined period of time equal to or less than one second, the timer counter value unchanged; timer counter comparing means connected to the OAM cell detecting means for comparing the timer counter value measuring a predetermined period of time equal to or less than one second after reception of the OAM cell with a reference value and for generating a discard signal only when the timer counter value is less than the reference value, failed state monitoring means connected to the OAM cell detecting means and the storage means for detecting the OAM cell for each virtual path or channel and for setting a failed state flag indicating failed state information of the storage means to "1", and cell discarding means connected to the OAM cell detecting means, the storage means, the timer counter comparing means, and the failed state monitoring means for discarding, when the discard signal is received from the timer counter comparing means, the OAM cell from the OAM cell detecting means and for thereby generating an empty cell.

In accordance with the present invention, there is provided an OAM cell detecting apparatus for detecting an OAM cell in an ATM layer in an ATM network in which a station is connected to a plurality of stations. The apparatus includes OAM cell detecting means for detecting an OAM cell in an ATM layer, storage means connected to the OAM cell detecting means for keeping a failed state flag, failed state information, and failed position display change flag for each virtual path or channel, failed state monitoring means connected to the OAM cell detecting means and the storage means for detecting the OAM cell for each virtual path or channel and for setting a failed state flag indicating failed state information of the storage means to "1", failed position display and comparator means connected to the OAM cell detecting means and the storage means, and cell discarding means connected to the OAM cell detecting means, the storage means, the failed state monitoring means, and the failed position display and comparator means for discarding, when the discard signal is received from the failed position display and comparator means, the OAM cell from the OAM cell detecting means and for thereby generating an empty cell. The failed position display and comparator means stores failed position display information included in the OAM cell in the storage means for each virtual path or channel. The failed position display and comparator means compares, when the failed position display change flag is "0", failed position display information of the OAM cell from the OAM cell detecting means with failed position display information previously stored. The failed position display and comparator means generates, when the comparison results in mismatching, the discard signal and feeds the signal to the cell discarding means. The failed position display and comparator means compares, when the failed position display change flag of the storage means is set to "1" by externally controlled firmware or software, the failed position display information of the OAM cell from the OAM cell detecting means with the failed position display information previously stored, and does not generate a discard signal even when the comparison results in mismatching. The failed position display and comparator means then updates the failed position display information previously stored in the storage means to the failed position display information of the OAM cell from the OAM cell detecting means and sets the failed position display change flag to "0".

In accordance with the present invention, there is provided an OAM cell detecting apparatus for detecting an OAM cell in an ATM layer in an ATM network in which a station is connected to a plurality of stations. The apparatus includes an OAM cell detecting means for detecting an OAM cell in an ATM layer, storage means connected to the OAM cell detecting means for keeping a timer counter value, a failed state flag, failed state information, and a failed position display change flag for each virtual path or channel, timer incrementing means connected to the storage means for incrementing the timer counter value independently of a cell receiving period and for keeping, when the timer counter value exceeds a predetermined period of time equal to or less than one second, the timer counter value unchanged, timer counter comparing means connected to the OAM cell detecting means for comparing the timer counter value measuring a predetermined period of time equal to or less than one second after reception of the OAM cell with a reference value and for generating a discard signal only when the timer counter value is less than the reference value, failed state monitoring means connected to the OAM cell detecting means and the storage means for detecting the OAM cell for each virtual path or channel and for setting a failed state (disabled state) flag indicating failed state information of the storage means to "1", failed position display and comparator means connected to the OAM cell detecting means and the storage means, and cell discarding means connected to the OAM cell detecting means, the storage means, the timer counter comparing means, the failed state monitoring means, and the failed position display and comparator means for discarding, when the discard signal is received from the timer counter comparing means or the failed position display and comparator means, the OAM cell from the OAM cell detecting means and for thereby generating an empty cell. The failed position display and comparator means stores failed position display information included in the OAM cell in the storage means for each virtual path or channel. The failed position display and comparator means compares, when the failed position display change flag is "0", failed position display information of the OAM cell from the OAM cell detecting means with failed position display information previously stored. The failed position display and comparator means generates, when the comparison results in mismatching, the discard signal and feeds the signal to the cell discarding means. The failed position display and comparator means compares, when the failed position display change flag of the storage means is set to "1" by externally controlled firmware or software, the failed position display information of the OAM cell from the OAM cell detecting means with the failed position display information previously stored, and does not generate a discard signal even when the comparison results in mismatching. The failed position display and comparator means updates the failed position display information previously stored in the storage means to the failed position display information of the OAM cell from the OAM cell detecting means and sets the failed position display change flag to "0".

In accordance with the present invention, there is provided an OAM cell detecting method of detecting an OAM cell in an ATM layer in an ATM network in which a station is connected to a plurality of stations. The method includes the steps of detecting an OAM cell in an ATM layer by OAM cell detecting means, keeping a timer counter value and failed state information for each virtual path or channel by storage means; incrementing by timer incrementing means the timer counter value independently of a cell receiving period and keeping, when the timer counter value exceeds a predetermined period of time equal to or less than one second, the timer counter value unchanged, comparing by timer counter comparing means the timer counter value measuring a predetermined period of time equal to or less than one second after reception of the OAM cell with a reference value and generating a discard signal only when the timer counter value is less than the reference value, detecting the OAM cell for each virtual path or channel and setting a failed state flag indicating failed state information of the storage means to "1" by failed state monitoring means, and discarding, when the discard signal is received from the timer counter comparing means, the OAM cell from the OAM cell detecting means and for thereby generating an empty cell by cell discarding means.

In accordance with the present invention, there is provided an OAM cell detecting method of detecting an OAM cell in an ATM layer in an ATM network in which a station is connected to a plurality of stations. The method includes the steps of detecting an OAM cell in an ATM layer by OAM cell detecting means, keeping a failed state flag, failed state information, and a failed position display change flag for each virtual path or channel by storage means, detecting the OAM cell for each virtual path or channel and setting a failed state flag indicating failed state information of the storage means to "1" by failed state monitoring means, storing failed position display information included in the OAM cell for each virtual path or channel in the storage means by failed position display and comparator means, comparing by the failed position display and comparator means, when the failed position display change flag is "0", failed position display information of the OAM cell from the OAM cell detecting means with failed position display information previously stored and generating, when the comparison results in mismatching, the discard signal and feeding the signal to the cell discarding means, comparing by the failed position display and comparator means, when the failed position display change flag of the storage means is set to "1" by externally controlled firmware or software, the failed position display information of the OAM cell from the OAM cell detecting means with the failed position display information previously stored, generating no discard signal even when the comparison results in mismatching, updating the failed position display information previously stored in the storage means to the failed position display information of the OAM cell from the OAM cell detecting means, and setting the failed position display change flag to "0", and discarding by cell discarding means, when the discard signal is received from the failed position display and comparator means, the OAM cell from the OAM cell detecting means and for thereby generating an empty cell.

In accordance with the present invention, there is provided an OAM cell detecting method of detecting an OAM cell in an ATM layer in an ATM network in which a station is connected to a plurality of stations. The method includes the steps of detecting an OAM cell in an ATM layer by OAM cell detecting means, keeping a timer counter value, a failed state flag, failed state information, and a failed position display change flag for each virtual path or channel by storage means, incrementing by timer incrementing means the timer counter value independently of a cell receiving period and keeping, when the timer counter value exceeds a predetermined period of time equal to or less than one second, the timer counter value unchanged, comparing by timer counter comparing means the timer counter value measuring a predetermined period of time equal to or less than one second after reception of the OAM cell with a reference value and generating a discard signal only when the timer counter value is less than the reference value, detecting the OAM cell for each virtual path or channel and setting a failed state flag indicating failed state information of the storage means to "1" by failed state monitoring means, storing by the failed position display and comparator means failed position display information included in the OAM cell in the storage means for each virtual path or channel, comparing by the failed position display and comparator means, when the failed position display change flag is "0", the failed position display information of the OAM cell from the OAM cell detecting means with the failed position display information previously stored, and generating, when the comparison results in mismatching, the discard signal and feeding the signal to the cell discarding means, comparing by the failed position display and comparator means, when the failed position display change flag of the storage means is set to "1" by externally controlled firmware or software, the failed position display information of the OAM cell from the OAM cell detecting means with the failed position display information previously stored, and generating no discard signal even when the comparison results in mismatching, updating the failed position display information previously stored in the storage means to the failed position display information of the OAM cell from the OAM cell detecting means, and setting the failed position display change flag to "0", and discarding by cell discarding means, when the discard signal is received from the timer counter comparing means or the failed position display and comparator means, the OAM cell from the OAM cell detecting means and thereby generating an empty cell.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of an embodiment of an OAM cell detecting apparatus in accordance with the present invention.

Figure 1:
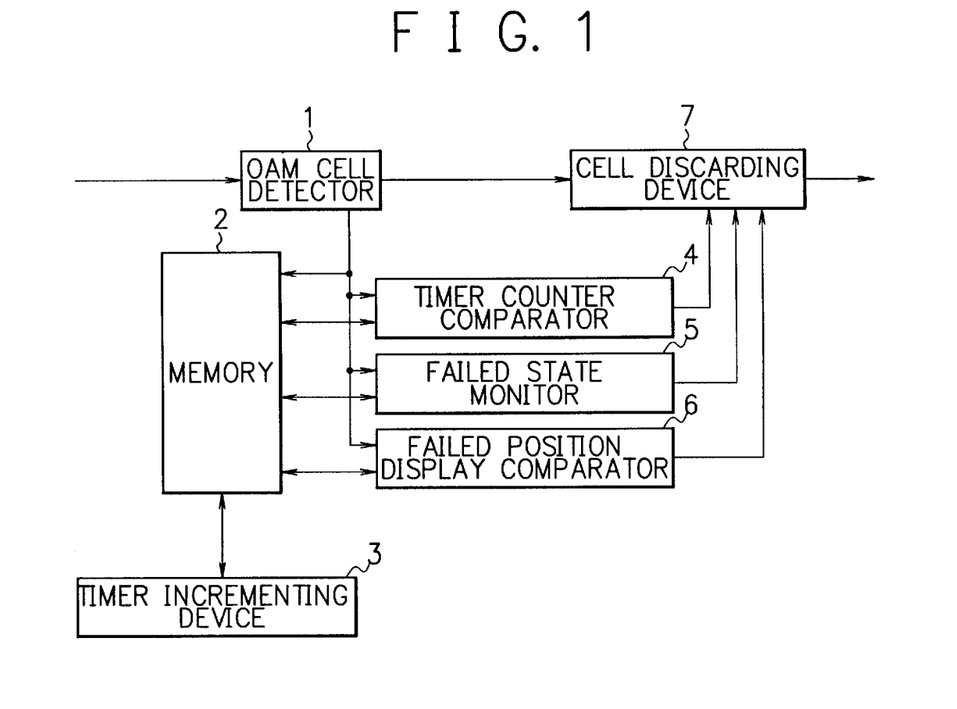
FIG. 1 is a schematic block diagram showing an embodiment of an OAM cell detecting apparatus in accordance with the present invention.

As shows in FIG. 1, this embodiment is an OAM cell detecting apparatus in an ATM layer of an ATM network in which one station is coupled with a plurality of stations. The apparatus includes an OAM cell detector 1, a memory 2, a timer incrementing device 3, a timer counter comparator 4, a failed state monitor 5, a failed position display and comparator 6, and a cell discarding device 7. Memory 2 is connected to OAM cell detector 1, timer incrementing device 3, timer counter comparator 4, failed state monitor 5, failed position display and comparator 6, and cell discarding device 7. Comparator 4, failed state monitor 5, and failed position display and comparator 6 each are connected to OAM cell detector 1 and cell discarding device 7.

OAM cell detector 1 detects an OAM cell in an ATM layer. Memory 2 keeps, for each virtual path or channel, a timer counter value, a failed state flag, failed position display information, a multi-failure display flag, and a failed position display change flag. Timer incrementing device 3 increments the timer counter value of memory 2 independently of a cell receiving period. If the timer counter value exceeds a predetermined period of time not exceeding one second, device 3 stops the incrementing of the count value and keeps the value unchanged. Timer counter comparator 4 compares the value of the timer counter measuring a predetermined time not exceeding one second lapsed after reception of an OAM cell from OAM cell detector 1 with a predetermined reference value. Only if the time counter value is less than the reference value, the comparator 4 generates a discard signal. Failed state monitor 5 detects, for each virtual path or channel, an OAM cell from OAM cell detector 1 and then sets the failed state flag indicating failed state information of memory 2 to "1".

Failed position display and comparator 6 stores, for each virtual path or channel, failed position display information of an OAM cell from OAM cell detector 1 in memory 2. When the failed position display change flag is "0", display and comparator 6 compares failed position display information of the OAM cell from OAM cell detector 1 with failed position display information previously stored. If mismatching results, display and comparator 6 generates a discard signal and sends the signal to cell discarding device 7. When the failed position display change flag is set to "1" by externally controlled firmware or software, display and comparator 6 compares failed position display information of the OAM cell from OAM cell detector 1 with failed position display information previously stored. Even if mismatching results, display and comparator 6 does not generate a discard signal and updates the failed position display information previously stored to the failed position display information of the OAM cell from OAM cell detector 1 and then sets the failed position display change flag is set to "0". After this point, if the failed position display change flag is "0", display and comparator 6 controls cell discarding device 7 to pass only an OAM cell of the same failed position display information. When a discard signal is being received from timer counter comparator 4 or when a discard signal is received from failed position display and comparator 6, cell discarding device 7 discards the OAM cell from OAM cell detector 1 to generate an empty cell.

Figure 3:
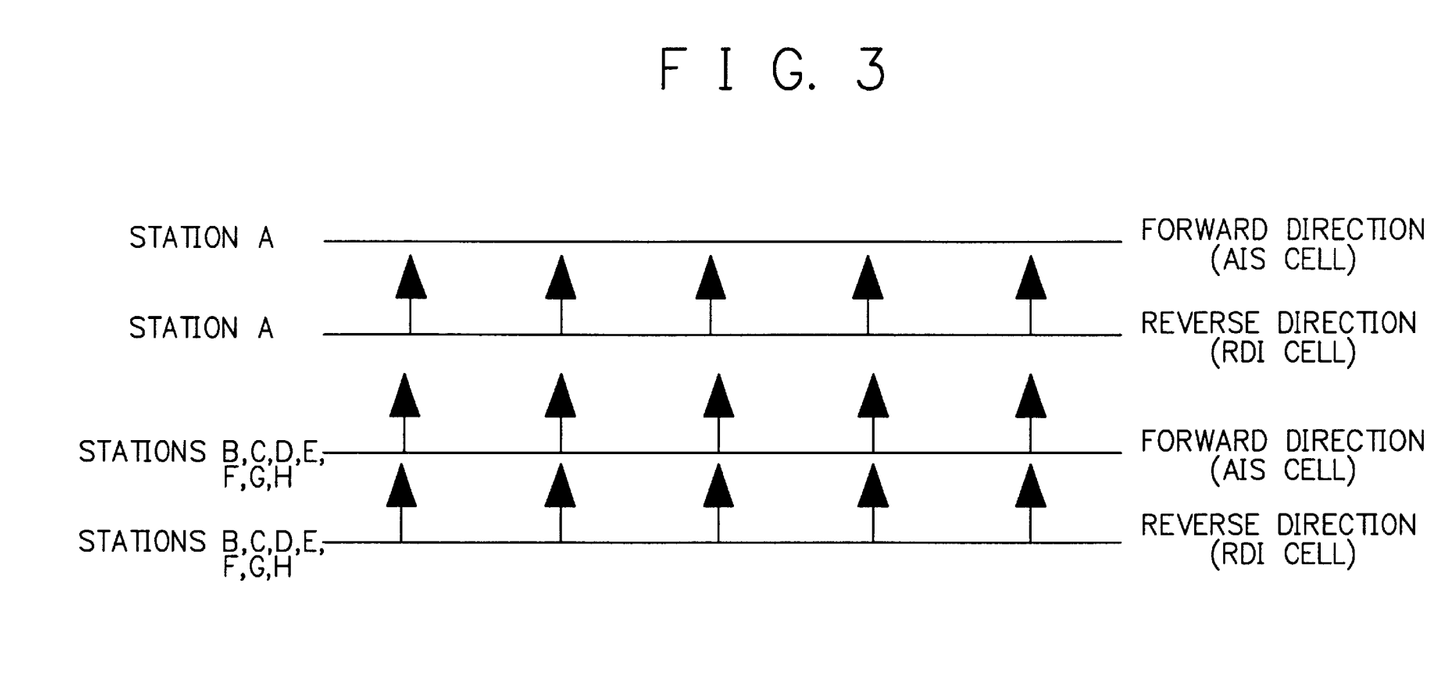
FIG. 3 is a traffic chart of AIS and RDI cells at occurrence of a single failure in an ATM network using the OAM cell detecting apparatus of FIG. 1.

Next, operation of the OAM detecting apparatus of FIG. 1 will be described by referring to the drawings. FIG. 2 shows connections at occurrence of a single failure in an ATM network in which one station is coupled with a plurality of stations. FIG. 3 shows in a traffic chart of AIS and RDI cells when a single failure takes place in an ATM network in which one station is coupled with a plurality of stations. OAM cell detector 1 detects a user cell and an empty cell (null cell) of ATM cells received. Detector 1 further detects VP and VC levels of an OAM level as well as AIS and RDI cells of OAM cell types. Four types of cells detected by OAM cell detector 1, namely, an AIS cell at a VP level, an AIS cell at a VC level, an RDI cell at a VP level, and an RDI cell at a VC level are respectively processed as follows. Description will be first given of processing in a case in which the received OAM cell is an AIS cell at a VP level. In this situation, timer counter comparator 4 obtains a timer counter value of the VPI from memory 2 to determine whether or not the timer counter value exceeds a predetermined period of time (e.g., 400 milliseconds (ms)) by comparing the timer counter value with a predetermined value. If the timer counter value is less than the predetermined time, comparator 4 generates a discard signal and feeds the signal to cell discarding device 7. If the timer counter value is equal to or more than the predetermined time, comparator 4 does not generate a discard signal and resets the timer counter value to "0".

When an AIS cell at a VP level is received, failed state monitor 5 acquires, from memory 2, a value of the failed state flag for an AIS cell at a VP level of the pertinent VPI. If the value indicates other than a failed state (a normal state, i.e., the failed state flag is "0"), monitor 5 sets the failed state flag to "1" and then writes in memory 2 failed position display information included in the received AIS cell at a VP level. At reception of a user cell of the VPI, monitor 5 resets the failed state flag of the VPI to a normal state.

In a state in which failed position display change flag is "0" in memory 2, when an AIS cell at a VP level is received, failed position display and comparator 6 acquires failed position display information of the VPI and a value of the multi-failure flag from memory 2 to compare the failed position display information with that included in the AIS cell at a VP level. If the comparison results in mismatching, display and comparator 6 generates a discard signal and sends the signal to cell discarding device 7. Display and comparator 6 sets the multi-failure flag to "1" to display a state of double failure. Whether or not the failed position display information in memory 2 is valid is determined according to the failed state of the pertinent VPI.

Timer incrementing device 3 operates independently of the cell receiving period. Device 3 sequentially obtains a timer counter value from memory 2 beginning at a smaller address thereof to increment the timer counter value. If the value is equal to a value indicating that a predetermined time (e.g., 400 ms) not exceeding one second has lapsed after reception of one cell, device 3 does not increment the value and keeps the value unchanged. When a discard signal is received from timer counter comparator 4 or failed position display and comparator 6, cell discarding device 7 discards the OAM cell from OAM cell detector 1 to generates an empty cell.

Figure 5:
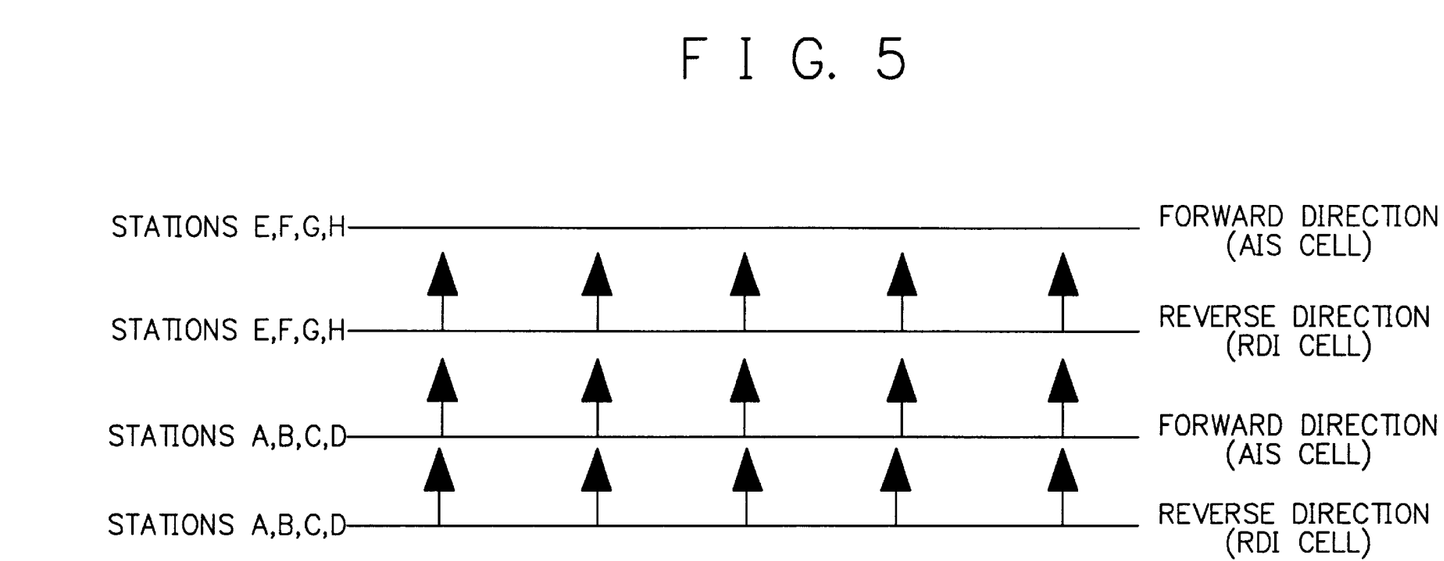
FIG. 5 is a traffic chart of AIS and RDI cells at occurrence of a double failure in an ATM network using the OAM cell detecting apparatus of FIG. 1.

Referring now to FIGS. 4 and 5, description will be given of operation of the OAM cell detecting apparatus of FIG. 1 when a double failure occurs in the ATM network. FIG. 4 shows connections at occurrence of a double failure in the ATM network in which one station is coupled with a plurality of stations. FIG. 5 is a traffic chart of AIS and RDI cells when a double failure takes place in the ATM network including connections between one station and a plurality of stations.

When failed position display change flag is "0", failed position display and comparator 6 compares failed position display information in the received AIS cell at a VP level with failed position display information stored in memory 2. If the comparison ends with mismatching, display and comparator 6 generates a discard signal and delivers the signal to cell discarding device 7. As a result, when the AIS cell at a VP Level first received by station B is the AIS cell at a VP level transmitted from station C, a failure at only one position, i.e., failure α can be recognized in accordance with to the AIS cell received by stations A and B and the RDI cells received by stations A to H.

To recognize a position of failure β, display and comparator 6 sets in a state of the multi-failure the failed position display change flag to "1" by externally controlled firmware of software. In this situation, even if mismatching results from the comparison between failed position display information in the received AIS cell at a VP level and failed position display information stored in memory 2, display and comparator 6 does not generate a discard signal. Display and comparator 6 updates the failed position display information stored in memory 2 to the failed position display information in the received AIS cell at a VP level and resets the failed position display change flag kept in memory 2. Thereafter, when the failed position display change flag is "0", display and comparator 6 controls cell discarding device 7 to pass only an received AIS cell at a VP level including the same failed position display information.

For other than the AIS cell at a VP level, namely, for an RDI cell at a VP level, an AIS cell at a VC level, and an RDI cell at a VC level, the receiving operation is conducted in the same way as for the AIS cell at a VP level. The parameters including the timer counter value are disposed for each OAM level and each OAM cell type. However, since an AIS cell and an RDI cell are not simultaneously received at an identical OAM level, a similar advantage can be obtained even when parameters are commonly utilized.

In accordance with the present invention, in an ATM network in which one station is connected to a plurality of stations, the OAM cell transfer is limited to a transfer rate of one OAM cell per second. This prevents the OAM cells from adversely influencing normal lines. In accordance with the present invention, even when a double failure takes place in an ATM network including connections between one station and a plurality of stations, one failed position can be recognized. The memory to keep monitoring parameters needs only small capacity.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An OAM cell detecting apparatus for detecting an OAM cell in an ATM layer in an ATM network in which a station is connected to a plurality of stations, comprising:

OAM cell detecting means for detecting an OAM cell in an ATM layer;

storage means connected to the OAM cell detecting means for keeping a timer counter value and failed state information for each virtual path or channel;

timer incrementing means connected to the storage means for incrementing the timer counter value independently of a cell receiving period and for keeping, when the timer counter value exceeds a predetermined period of time equal to or less than one second, the timer counter value unchanged;

timer counter comparing means connected to the OAM cell detecting means for comparing the timer counter value measuring a predetermined period of time equal to or less than one second after reception of the OAM cell with a reference value and for generating a discard signal only when the timer counter value is less than the reference value;

failed state monitoring means connected to the OAM cell detecting means and the storage means for detecting the OAM cell for each virtual path or channel and for setting a failed state flag indicating failed state information of the storage means to "1"; and cell discarding means connected to the OAM cell detecting means, the storage means, the timer counter comparing means, and the failed state monitoring means for discarding, when the discard signal is received from the timer counter comparing means, the OAM cell from the OAM cell detecting means and for thereby generating an empty cell.

2. An OAM cell detecting apparatus for detecting an OAM cell in a ATM layer in an ATM network in which a station is connected to a plurality of stations, comprising:

OAM cell detecting means for detecting an OAM cell in an ATM layer;

storage means connected to the OAM cell detecting means for keeping a failed state flag, failed state information, and failed position display change flag for each virtual path or channel;

failed state monitoring means connected to the OAM cell detecting means and the storage means for detecting the OAM cell for each virtual path or channel and for setting a failed state flag indicating failed state information of the storage means to "1";

failed position display and comparator means connected to the OAM cell detecting means and the storage means; and cell discarding means connected to the OAM cell detecting means, the storage means, the failed state monitoring means, and the failed position display and comparator means for discarding, when the discard signal is received from the failed position display and comparator means, the OAM cell from the OAM cell detecting means and for thereby generating an empty cell, wherein:

the failed position display and comparator means stores failed position display information included in the OAM cell in the storage means for each virtual path or channel;

the failed position display and comparator means compares, when the failed position display change flag is "0", failed position display information of the OAM cell from the OAM cell detecting means with failed position display information previously stored;

the failed position display and comparator means generates, when the comparison results in mismatching, the discard signal and feeds the signal to the cell discarding means;

the failed position display and comparator means compares, when the failed position display change flag of the storage means is set to "1" by externally controlled firmware or software, the failed position display information of the OAM cell from the OAM cell detecting means with the failed position display information previously stored, and does not generate a discard signal even when the comparison results in mismatching; and the failed position display and comparator means then updates the failed position display information previously stored in the storage means to the failed position display information of the OAM cell from the OAM cell detecting means and sets the failed position display change flag to "0".

3. An OAM cell detecting apparatus for detecting an OAM cell in an ATM layer in an ATM network in which a station is connected to a plurality of stations, comprising:

OAM cell detecting means for detecting an OAM cell in an ATM layer;

storage means connected to the OAM cell detecting means for keeping a timer counter value, a failed state flag, failed state information, and a failed position display change flag for each virtual path or channel;

timer incrementing means connected to the storage means for incrementing the timer counter value independently of a cell receiving period and for keeping, when the timer counter value exceeds a predetermined period of time equal to or less than one second, the timer counter value unchanged;

timer counter comparing means connected to the OAM cell detecting means for comparing the timer counter value measuring a predetermined period of time equal to or less than one second after reception of the OAM cell with a reference value and for generating a discard signal only when the timer counter value is less than the reference value;

failed state monitoring means connected to the OAM cell detecting means and the storage means for detecting the OAM cell for each virtual path or channel and for setting a failed state flag indicating failed state information of the storage means to "1";

failed position display and comparator means connected to the OAM cell detecting means and the storage means; and cell discarding means connected to the OAM cell detecting means, the storage means, the timer counter comparing means, the failed state monitoring means, and the failed position display and comparator means for discarding, when the discard signal is received from the timer counter comparing means or the failed position display and comparator means, the OAM cell from the OAM cell detecting means and for thereby generating an empty cell, wherein the failed position display and comparator means stores failed position display information included in the OAM cell in the storage means for each virtual path or channel;

the failed position display and comparator means compares, when the failed position display change flag is "0", failed position display information of the OAM cell from the OAM cell detecting means with failed position display information previously stored;

the failed position display and comparator means generates, when the comparison results in mismatching, the discard signal and feeds the signal to the cell discarding means;

the failed position display and comparator means compares, when the failed position display change flag of the storage means is set to "1" by externally controlled firmware or software, the failed position display information of the OAM cell from the OAM cell detecting means with the failed position display information previously stored, and does not generate a discard signal even when the comparison results in mismatching; and the failed position display and comparator means updates the failed position display information previously stored in the storage means to the failed position display information of the OAM cell from the OAM cell detecting means and sets the failed position display change flag to "0".

4. An OAM cell detecting method of detecting an OAM cell in an ATM layer in an ATM network in which a station is connected to a plurality of stations, comprising the steps of:

detecting an OAM cell in an ATM layer by OAM cell detecting means;

keeping a timer counter value and failed state information for each virtual path or channel by storage means;

incrementing by timer incrementing means the timer counter value independently of a cell receiving period and keeping, when the timer counter value exceeds a predetermined period of time equal to or less than one second, the timer counter value unchanged;

comparing by timer counter comparing means the timer counter value measuring a predetermined period of time equal to or less than one second after reception of the OAM cell with a reference value and generating a discard signal only when the timer counter value is less than the reference value;

detecting the OAM cell for each virtual path or channel and setting a failed state flag indicating failed state information of the storage means to "1" by failed state monitoring means; and discarding, when the discard signal is received from the timer counter comparing means, the OAM cell from the OAM cell detecting means and for thereby generating an empty cell by cell discarding means.

5. An OAM cell detecting method of detecting an OAM cell in an ATM layer in an ATM network in which a station is connected to a plurality of stations, comprising the steps of:

detecting an OAM cell in an ATM layer by OAM cell detecting means;

keeping a failed state flag, failed state information, and a failed position display change flag for each virtual path or channel by storage means;

detecting the OAM cell for each virtual path or channel and setting a failed state flag indicating failed state information of the storage means to "1" by failed state monitoring means;

storing failed position display information included in the OAM cell for each virtual path or channel in the storage means by failed position display and comparator means;

comparing by the failed position display and comparator means, when the failed position display change flag is "0", failed position display information of the OAM cell from the OAM cell detecting means with failed position display information previously stored and generating, when the comparison results in mismatching, the discard signal and feeding the signal to the cell discarding means;

comparing by the failed position display and comparator means, when the failed position display change flag of the storage means is set to "1" by externally controlled firmware or software, the failed position display information of the OAM cell from the OAM cell detecting means with the failed position display information previously stored, generating no discard signal even when the comparison results in mismatching, updating the failed position display information previously stored in the storage means to the failed position display information of the OAM cell from the OAM cell detecting means, and setting the failed position display change flag to "0"; and discarding by cell discarding means, when the discard signal is received from the failed position display and comparator means, the OAM cell from the OAM cell detecting means and for thereby generating an empty cell.

6. An OAM cell detecting method of detecting an OAM cell in an ATM layer in an ATM network in which a station is connected to a plurality of stations, comprising the steps of:

detecting an OAM cell in an ATM layer by OAM cell detecting means;

keeping a timer counter value, a failed state flag, failed state information, and a failed position display change flag for each virtual path or channel by storage means;

incrementing by timer incrementing means the timer counter value independently of a cell receiving period and keeping, when the timer counter value exceeds a predetermined period of time equal to or less than one second, the timer counter value unchanged;

comparing by timer counter comparing means the timer counter value measuring a predetermined period of time equal to or less than one second after reception of the OAM cell with a reference value and generating a discard signal only when the timer counter value is less than the reference value;

detecting the OAM cell for each virtual path or channel and setting a failed state flag indicating failed state information of the storage means to "1" by failed state monitoring means;

storing by a failed position display and comparator means failed position display information included in the OAM cell in the storage means for each virtual path or channel;

comparing by the failed position display and comparator means, when the failed position display change flag is "0", the failed position display information of the OAM cell from the OAM cell detecting means with the failed position display information previously stored, and generating, when the comparison results in mismatching, the discard signal and feeding the signal to the cell discarding means;

comparing by the failed position display and comparator means, when the failed position display change flag of the storage means is set to "1" by externally controlled firmware or software, the failed position display information of the OAM cell from the OAM cell detecting means with the failed position display information previously stored, and generating no discard signal even when the comparison results in mismatching, updating the failed position display information previously stored in the storage means to the failed position display information of the OAM cell from the OAM cell detecting means, and setting the failed position display change flag to "0"; and discarding by cell discarding means, when the discard signal is received from the timer counter comparing means or the failed position display and comparator means, the OAM cell from the OAM cell detecting means and thereby generating an empty cell.

* * * * *